(12) United States Patent
Eulitz

(10) Patent No.: US 8,678,226 B2
(45) Date of Patent: Mar. 25, 2014

(54) FUEL CONTAINER

(75) Inventor: Dirk Eulitz, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 344 days.

(21) Appl. No.: 12/665,999

(22) PCT Filed: May 7, 2008

(86) PCT No.: PCT/EP2008/003637
§ 371 (c)(1),
(2), (4) Date: Jun. 2, 2010

(87) PCT Pub. No.: WO2009/000362
PCT Pub. Date: Dec. 31, 2008

(65) Prior Publication Data
US 2010/0230415 A1  Sep. 16, 2010

(30) Foreign Application Priority Data

Jun. 22, 2007  (DE) .......................... 10 2007 029 261

(51) Int. Cl.
*B65D 88/12*  (2006.01)
(52) U.S. Cl.
USPC ...... 220/562; 220/4.13; 220/4.14; 220/567.2; 220/586; 137/583; 123/495; 123/509; 123/514
(58) Field of Classification Search
USPC .................... 220/4.13, 4.14, 562, 586, 567.2; 137/583; 123/495, 509, 514
See application file for complete search history.

(56) References Cited

U.S. PATENT DOCUMENTS 6,360,729 B1  3/2002  Ellsworth
6,360,765 B1  3/2002  Pozgainer
(Continued)

FOREIGN PATENT DOCUMENTS

DE  3600177  7/1986
DE  19600872  7/1997
(Continued)

OTHER PUBLICATIONS

International Search Report dated Sep. 2, 2008 issued in PCT Patent Application No. PCT/EP2008/003637, 3 pages.
(Continued)

*Primary Examiner* — Anthony Stashick
*Assistant Examiner* — Elizabeth Volz
(74) *Attorney, Agent, or Firm* — Grossman Tucker Perreault & Pfleger, PLLC

(57) ABSTRACT

The invention relates to a fuel tank (1) consisting of thermoplastic, with at least one continuous seam (3), with a filler orifice, with means for aeration and venting and with means for the conveyance and extraction of fuel which are in the form of at least one fuel conveying unit (11) arranged inside the fuel tank (1). In the fuel tank (1) according to the invention, with the exception of the filler orifice, no orifices or perforations which are substantially larger than the diameter of the line to be led through are provided in the tank wall, instead the fluid lines and/or electrical lines led out of or into the fuel tank (1) pass through the seam (3) of the fuel tank (1) so as to extend at an angle with respect to the profile of the seam (3), and/or are led partially through the filler orifice and, if appropriate, a filler neck adjoining the filler orifice.

40 Claims, 3 Drawing Sheets

(56) References Cited

U.S. PATENT DOCUMENTS

Figure 1:
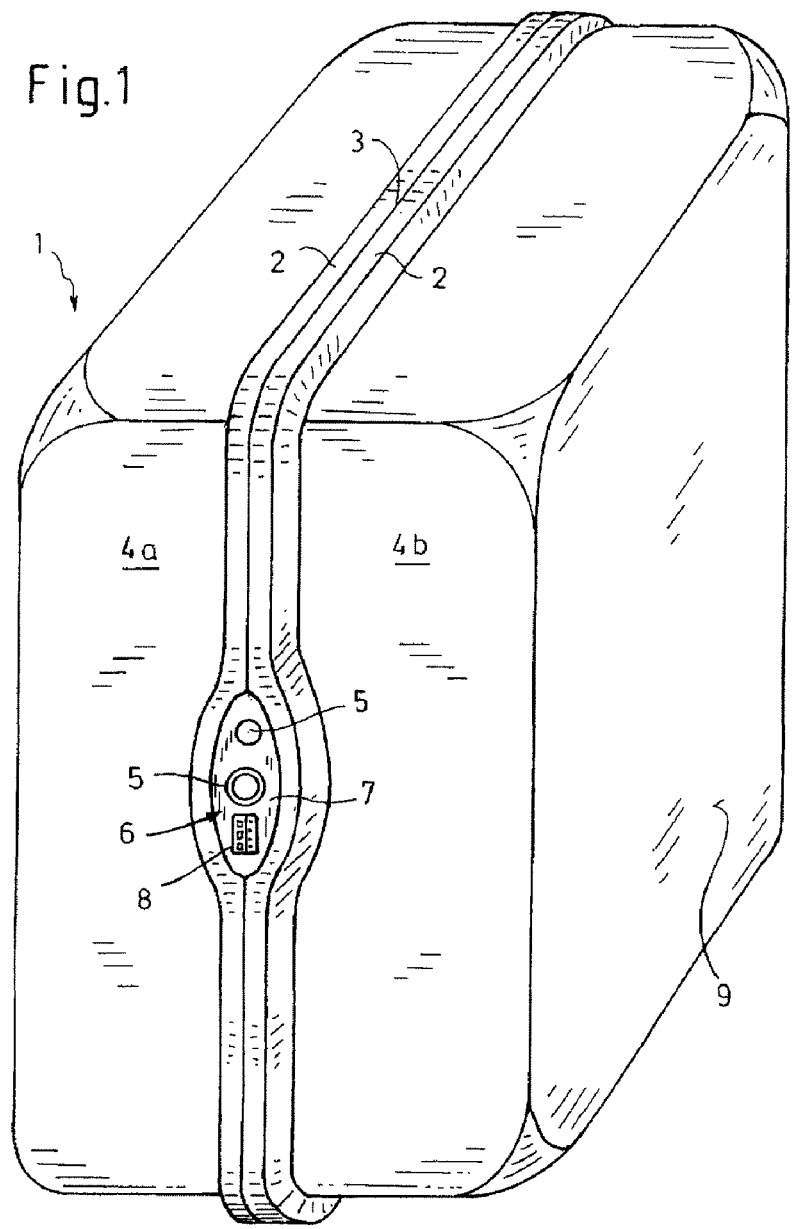

| | | | |
|---|---|---|---|
| 6,612,458 B2 | 9/2003 | Balzer et al. | |
| 6,948,511 B2 * | 9/2005 | Taurel et al. | 137/15.01 |
| 7,211,307 B2 | 5/2007 | Potter et al. | |
| 7,228,847 B2 * | 6/2007 | Burke et al. | 123/509 |
| 2001/0013516 A1 * | 8/2001 | Boecker | 220/562 |
| 2005/0011891 A1 * | 1/2005 | Austerhoff et al. | 220/4.12 |

FOREIGN PATENT DOCUMENTS

| | | |
|---|---|---|
| EP | 0792767 | 9/1997 |
| GB | 2246769 | 2/1992 |
| JP | 62131819 | 6/1987 |
| JP | 2006198810 | 8/2006 |
| WO | 2008003386 | 1/2008 |

OTHER PUBLICATIONS

International Written Opinion dated Dec. 22, 2009 issued in PCT Patent Application No. PCT/EP2008/003637, 8 pages. English language translation not available.
International Preliminary Report on Patentability dated Jan. 21, 2010 issued in PCT Patent Application No. PCT/EP2008/003637, 9 pages.
English translation of Japanese Office Action dated Feb. 22, 2012, received in related Japan Patent Application No. 2010-512539, 4 pgs.

* cited by examiner

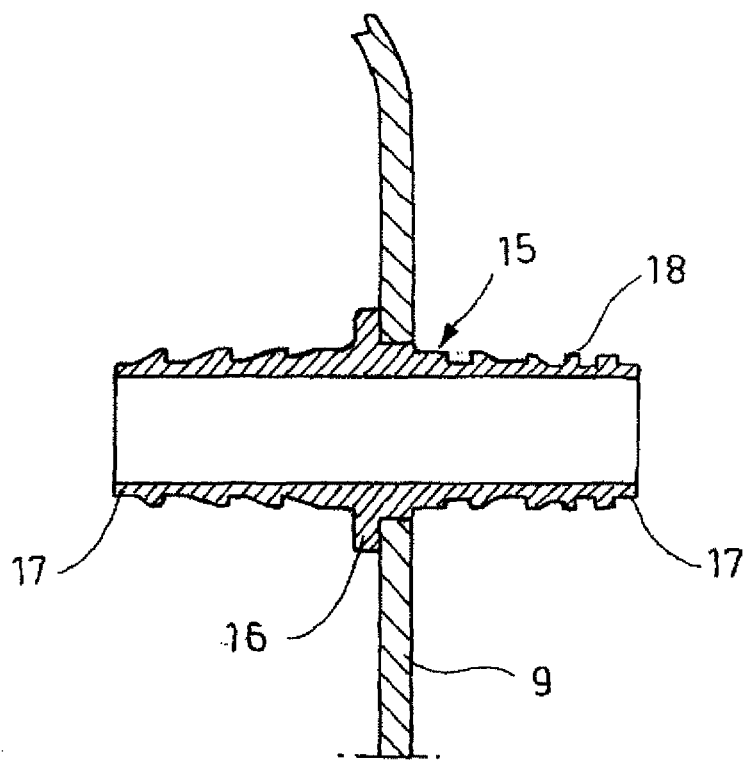

FUEL CONTAINER

The invention relates to a fuel tank consisting of thermoplastic. Such fuel tanks can be produced in the most diverse possible ways, for example by extrusion blow molding, thermoforming or injection molding. In the production of fuel tanks by extrusion blow molding, the tank has been obtained from a preform extruded in tubular form and consisting of plasticized plastic. The preform is then expanded within a two-part die under the action of gas pressure, the die defining the outer contour of the ready-formed tank. Alternatively, it is possible to extrude web-shaped preforms and shape them in a die provided for this purpose, using gas pressure and/or a vacuum.

Since specific plastics are permeable to hydrocarbons, in the production of fuel tanks from thermoplastic, special measures are required in order to ensure their leaktightness. Usually, modern fuel tanks are produced from plastic consisting of multilayer coextrudates which contain barrier layers for hydrocarbons. The permeation leaktightness of the tank wall therefore usually does not present any problem. However, as before, weak points with regard to possible permeation sources are seams, orifices with connecting nipples, valves or the like. In addition to a filler orifice, venting and extraction orifices and also leadthroughs for electrical lines have to be provided on a fuel tank. Finally, it is necessary to supply electrical energy to the assemblies, such as, for example, the fuel pump, which are arranged in the fuel tank. Also for reasons of reduced hydrocarbon emissions, efforts are made to shift as many functional groups of a fuel tank as possible, such as, for example, the fuel conveying unit, discharge tank and fuel vapor filter, into the interior of the tank. A considerable reduction of orifices in the tank wall is thereby achieved. Any orifice or perforation in the tank wall constitutes a potential leakage point. In the prior art, therefore, countless efforts to minimize the number of orifices in the tank wall or to restrict their size to a reasonable amount are described.

Countless publications are concerned with the problem of designing the orifice required for the fuel conveying unit in the tank with a relatively small diameter. Usually, fuel conveying units comprise a fuel pump with an electric motor and, where appropriate, a fuel filter, which are arranged together in a baffle or dashpot. The baffle ensures that the fuel pump is supplied with sufficient fuel in any driving situation, that is to say during acceleration or cornering or when the vehicle is inclined sharply about the transverse or the longitudinal axis. Furthermore, the baffle also defines the reserve volume, and it, too, is provided with at least one filling-level transmitter.

Limits are placed on minimizing the reception volume of the baffle, particularly on motor vehicles of high engine power. Countless publications are therefore concerned with configuring the fuel conveying unit in a modular manner, so that, in the installation position on the bottom of the fuel tank, it occupies a larger volume that in the non-mounted state. Thus, for example, the size of the inspection orifice necessary for inserting the fuel conveying unit can be reduced. This inspection orifice also serves for carrying out any repair or exchange measures required on the conveying unit.

Finally, it is known from the prior art to provide in the fuel tank itself necked-in portions which are closed sealingly by means of a cover or cowl. The required orifices can then be provided under the cover or cowl in the fuel tank.

DE 196 00 872 discloses a fuel tank with a fuel conveying device which is arranged in it and has an orifice through which hydraulic and/or electrical connecting lines of the fuel conveying device are led outward. During the process of producing the fuel tank, the fuel conveying device has been introduced into the latter and surrounded by the one-piece fuel tank. That is to say, the fuel conveying unit has been blown into the fuel tank at the same time as the latter has been formed. The fuel tank can therefore have an orifice, the diameter of which is substantially smaller than the dimensions of the fuel conveying unit. It is proposed in DE 196 00 872 A1 to close the orifice sealingly by means of a plug, the fuel extraction line and electrical lines being led through the plug closing the orifice.

Apart from the fuel extraction line and the electrical lines for the electrical assemblies located in the fuel tank, at least operating and refueling venting lines also have to be provided on the fuel tank. For this purpose, leadthroughs in the tank likewise have to be provided. DE 196 00 872 does not show any solution to this problem.

The problem on which the invention is based, therefore, is to provide a completely novel fuel tank consisting of thermoplastic, in which the number of orifices required in the tank wall is restricted to a minimum.

The object is achieved, according to the invention, by means of a fuel tank consisting of thermoplastic, with at least one continuous seam, with a filler orifice, with means for aeration and venting and with means for the conveyance and extraction of fuel, in the form of at least one fuel conveying unit arranged inside the fuel tank, with fluid lines and/or electrical lines led into the fuel tank and/or out of the latter, no orifice and/or no perforation, the diameter of which is substantially larger than the diameter of the respective line, being provided in the tank wall. In other words, the fuel tank according to the invention manages without the otherwise conventional circumscriptions and inspection orifices. Thus, the fuel tank according to the invention offers a minimum of potential leakage paths. Leakage within the meaning of the invention is not understood as meaning the otherwise customary loss of liquid to a visible extent, but is also to be understood as meaning hydrocarbon emissions in a scarcely measurable or scarcely perceptible range.

A preferred variant of the fuel tank according to the invention is distinguished in that at least one of the fluid lines is connected to a connection element passing directly through the tank wall. Such a connection element may be designed, for example, as a nipple with a pine-tree-shaped profile, which, during the forming of the tank, has been welded to the tank wall so as to pierce or pass through the tank wall.

In a preferred variant of the fuel tank according to the invention, there is provision whereby at least some of the fluid lines and/or electrical lines led out of or into the fuel tank pass through the seam of the fuel tank, so as to extend at an angle with respect to the profile of the seam, and/or are led at least partially through the filler orifice and, if appropriate, through a filler neck adjoining the filler orifice. In this variant of the fuel tank, there may be provision whereby, with the exception of the filler orifice, no orifices or perforations are provided in the tank wall.

Tank wall in the sense of the invention is to be understood as meaning the undisturbed wall region of the tank, but not the seam joint at which portions of the tank wall are welded to one another. The tank may be obtained, for example, by the thermal forming of two half shells or by the assembling of two injection-molded half shells or by extrusion blow molding of two web-shaped preforms. In the sense of the invention, leadthroughs through the tank in the region of the seam, which do not pass through the layered structure of the tank wall, are not to be understood as meaning perforations through the wall of the fuel tank.

The fuel tank according to one variant of the invention is distinguished, in particular, in that, with the exception of the filler orifice, a completely undisturbed and unperforated tank wall is provided. The fluid lines and electrical lines which are absolutely necessary for operating the fuel tank are led either through the continuous weld seam of the tank or through the filler neck of the tank.

The invention may be summarized to the effect that the required leadthroughs for the extraction of fuel and for venting of the tank and also for electrical lines are arranged in a region of the tank which may represent a potential leakage point which is unavoidable as a consequence of production. In the production of the fuel tank by the extrusion blow molding of a tubular preform, the tank possesses a continuous mash seam in the region of division of the die halves. If the fuel tank is manufactured from deep-drawn or injection-molded half shells, a continuous weld seam is obtained on a flange-like continuous marginal region of the tank. Finally, the fuel tank according to the invention may also be blow-molded from web-shaped or strip-shaped extrudates, this likewise resulting in a continuous seam joint. Depending on the choice of the production method, the technique for introducing the fuel conveying unit and all the other fittings required into the tank will be different. When the fuel tank is produced from an extrusion blow-molded tubular preform, for example, the fuel conveying unit can have been blown around in the known way. In all other production variants, the fuel conveying unit and all other fittings can have been introduced before the shells of the fuel tank are assembled.

In a particularly preferred variant of the invention, no inspection orifice is provided, and the functional fittings provided in the fuel tank are designed for the entire service life of the fuel tank.

In other words, according to the invention, orifices, through which later access to the inside of the tank for maintenance or inspection purposes will be possible, are dispensed with entirely. The invention therefore follows a completely different path from the prior art.

In one variant of the fuel tank according to the invention, there is provision whereby exactly three fluid lines are led into or out of the fuel tank. The terms "into" or "out of", such as are used in this context, relate to the medium carried in the line and are not intended to characterize the profile of the line.

Preferably, exactly one filler line, exactly one venting line and exactly one fuel extraction line are provided. The venting line may also embrace the aeration functionality. The aeration and venting line and also the fuel extraction line could be laid inside a jacket pipe, provided for this purpose, through the filler neck. The electrical lines required could also be received in this jacket pipe.

In an expedient refinement of the fuel tank according to the invention, this is composed of at least two shells which in each case form a flange-like margin in the region of the seam.

At least one of the lines led out of or into the fuel tank may extend, in the region of the leadthrough through the seam, in the parting plane of the shells and preferably approximately transversely with respect to the profile of the seam.

The wall of the tank may also consist of a multilayer extrudate with at least one barrier layer for hydrocarbons.

In advantageous refinement of the fuel tank according to the invention, there is provision whereby at least one line is connected to an insert part which passes through the seam of the fuel tank and which consists at least partially of plastic and is welded to the plastic of the tank in the seam.

The insert part can, for example, have been inserted between the continuous margins of the shells and welded to these during the connection of the shells of the tank.

The insert part is preferably designed as a plug connector.

Figure 2:
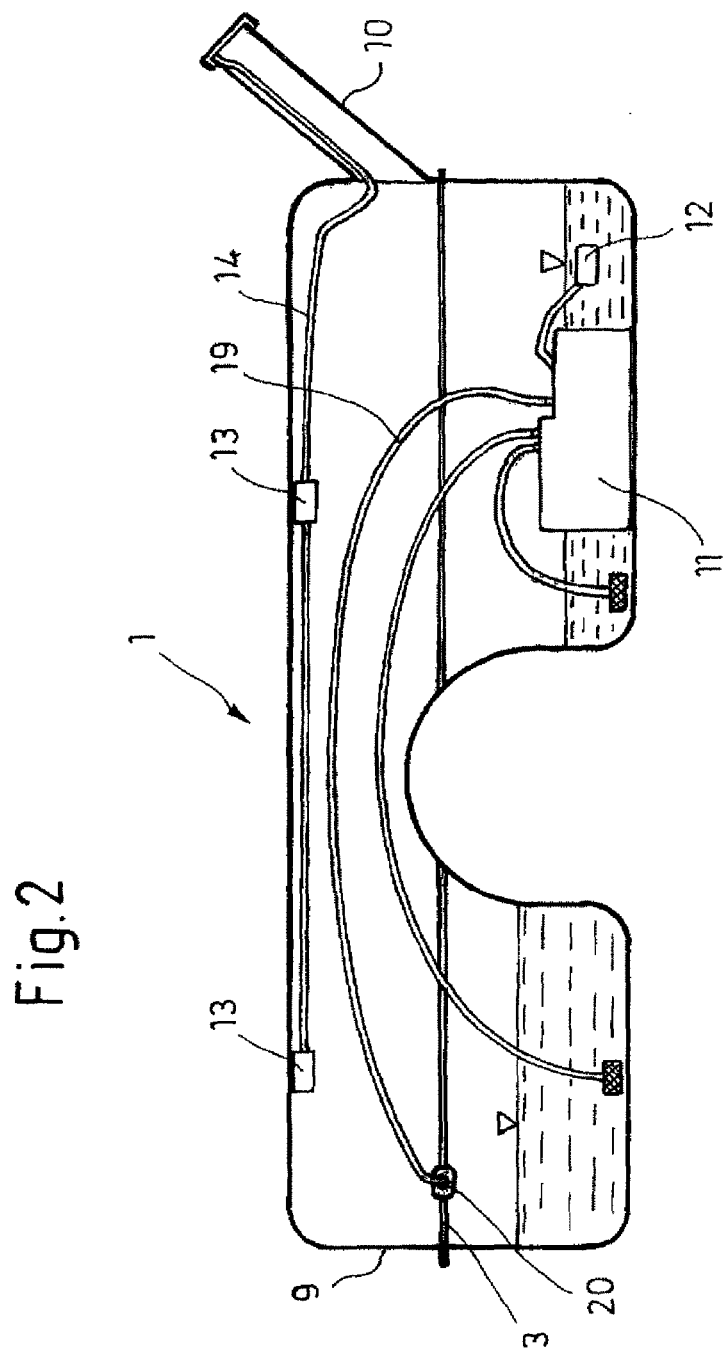

The invention is explained below with reference to an exemplary embodiment illustrating the drawings in which:

FIG. 1 shows a diagrammatic and greatly simplified view of a fuel tank according to the invention according to a first exemplary embodiment, and FIG. 2 shows a greatly simplified diagrammatic view, partially in section, of a fuel tank according to a second exemplary embodiment of the invention, and FIG. 3 shows a sectional view through the wall of the fuel tank and a connection element passing through the wall in the region.

The fuel tank 1 according to the invention is illustrated, greatly simplified, in FIG. 1, and here the filler orifice conventionally provided on the fuel tank 1 and having a filler neck arranged on it is illustrated. The fuel tank 1 has been produced by the extrusion blow molding of two web-shaped extrudates in a multistage shaping process, specifically using a three-part die with two outer molds and with one middle mold. In this case, first, two web-shaped extrudates were placed in the first heat, that is to say in the still plastic state, and without further heating, between the outer molds and the middle mold. The outer molds have in each case part cavities which correspond to the subsequent outer contour of the finished fuel tank. In one step, the outer molds are closed against the middle mold, in each case the preforms being arranged between the outer molds and the middle mold. The preforms are then expanded inside the mold and laid against the inner faces of the part cavities of the outer mold. Via component holders arranged in the middle mold, the functional components required for operating a fuel tank are arranged inside the tank half shells thus manufactured. The outer molds are then moved apart, the middle mold is moved away between the outer molds and the outer molds are moved toward one another, so that the half shells of the fuel tank are welded to one another in the region of their flange-like continuous margins 2.

The half shells of the fuel tank 1 are produced from a six-layer coextrudate with a barrier layer for hydrocarbons which is embedded into this.

As is clear from FIG. 1, the fuel tank 1 possesses a continuous seam 3, at which the flange-like margins 2 of the half shells 4a, 4b of the fuel tank 1 are welded to one another. Furthermore, the fuel tank 1 is provided with a filler pipe 10 which is illustrated, greatly simplified, in FIG. 2. The geometry of the fuel tank 1 is likewise greatly simplified in the figures. It is obvious to a person skilled in the art that the fuel tank 1 may have a relatively fissured and complex outer structure, for example the fuel tank 1 may be designed as a saddle tank which is necked-in in its middle region so as to form two main volumes. The necked-in region is usually arranged above the cardan shaft of a motor vehicle when the fuel tank is in the installation position.

According to the invention, on the fuel tank 1, a plurality of leadthroughs 5 are provided which pass through the seam 3 of the fuel tank 1 such that they form an interface of the fuel tank. These leadthroughs 5 are arranged in a multifunction coupling 6 designed as an insert part. The multifunction coupling 6 possesses a basic body 7 consisting of thermoplastic which, in the exemplary embodiment illustrated, has overall two leadthroughs 5 and an electrical plug contact 8. The larger of the leadthroughs 5 may, for example, be provided for a venting line, whereas the smaller of the leadthroughs 5 may be provided for a fuel extraction line. The plug contacts 8 may serve, for example, for electric supply of a fuel conveying unit 11 illustrated in FIG. 2, and, furthermore, the signal from a filling-level transmitter 12 may be picked off via the plug contacts 8.

In the exemplary embodiment illustrated in FIG. 2, the leadthroughs 5 provided in the seam 3 of the fuel tank 1 constitute the sole outward interface of the fuel tank 1. The exception to this is, of course, the filler pipe 10, via which a filling of the fuel tank 1 must take place. With the exception of the orifice provided for the filler pipe 10 in the fuel tank 1, the wall 9 of the fuel tank 1 is intact, that is to say no further perforations are provided. The fittings provided in the fuel tank 1, which are in the form of a fuel conveying unit or of other functional components, are designed for the service life of the fuel tank 1, and in the event of their failure the entire fuel tank 1 has to be exchanged.

In the variant of the fuel tank 1, as illustrated in FIG. 2, venting valves 13 which are connected to one another via a venting line 14 are provided at the balance volume of the fuel tank, that is at the points on the fuel tank 1 which are highest in the installation position. These venting valves 13 can also be provided additionally, in a way known per se, with what are known as rollover valves which, actuated by gravity, close the venting line 14. The venting line 14, which may be designed, for example, as a refueling venting line, is led outwards through the filler pipe 10. An electrical line is designated by 19 and is led outward at 20 directly through the seam 3 of the tank. Alternatively to this, of course, electrical lines may also be led through the filler pipe 10.

The fuel tank 1 according to the invention possesses no inspection orifice through which components inside the fuel tank 1 would be accessible.

It is clear to a person skilled in the art that, instead of the multifunction coupling 6, corresponding lines may be led directly through the seam of the fuel tank 1.

In the variant of the fuel tank 1 according to the invention, as shown in FIG. 3, there is provision whereby, for connecting one or more fluid lines, one or connection elements 15 are provided which are designed, for example, as double nipples and have on each of the two sides of a continuous collar 16 a spigot 17 with a pine-tree profile 18. The spigots serve for choking and fastening of fluid lines. When the fuel tank 1 was being formed inside the die, it was penetrated by the connection element 15. In this case, the connection element was pushed by means of a manipulator provided for this purpose through the wall 9 of the fuel tank 1 into a die plate provided in the die. In the region of the continuous collar 16, the connection element 15 is welded to the wall 9 of the fuel tank. The orifice channeled through the connection element 15 in the wall 9 of the fuel tank 1 possesses a diameter which is only slightly larger than the diameter of the connection element 15 or than the diameter of the fluid lines to be plugged onto this.

LIST OF REFERENCE SYMBOLS

1 Fuel tank
2 Margins
3 Seam
4a, b Half shells
5 Leadthroughs
6 Multifunction couplings
7 Basic body
8 Electrical plug contact
9 Wall
10 Filler pipe
11 Fuel conveying unit
12 Filling-level transmitter
13 Venting valves
14 Venting line
15 Connection element
16 Collar
17 Spigot
18 Pine-tree profile
19 Electrical line
20 Leadthrough through the seam of the tank

What is claimed is:

1. A fuel tank comprising:
a tank wall of thermoplastic;
at least one continuous seam which joins portions of the tank wall;
a filler orifice;
means which provide aeration and venting;
means which provide conveyance and extraction of fuel in a form of at least one fuel conveying unit arranged inside the fuel tank;
at least one line led into and/or out of the fuel tank, the at least one line led into and/or out of the fuel tank comprising at least one fluid line and/or at least one electrical line led into and/or out of the fuel tank;
wherein the at least one line led into and/or out of the fuel tank comprises a first line which passes through the seam of the fuel tank;
wherein the at least one line led into and/or out of the fuel tank comprises a second line which is led at least partially through at least one of the filler orifice and a filler neck adjoining the filler orifice;
wherein the first line is connected to an insert part which passes through the seam of the fuel tank and which is at least partially of plastic and is welded to the tank at the seam;
wherein the insert part includes at least one of a plug contact and a leadthrough for the first line which is formed by a body of the insert part; and
wherein the at least one plug contact and leadthrough is spaced from the seam by the body of the insert part and does not make contact with the seam.

2. The fuel tank as claimed in claim 1, characterized in that the first line which passes through the seam of the fuel tank further passes through the seam of the fuel tank so as to extend at an angle with respect to a profile of the seam.

3. The fuel tank as claimed in claim 1, characterized in that the fuel tank does not include an inspection orifice, and the at least one fuel conveying unit provided in the fuel tank is designed for an entire service life of the fuel tank.

4. The fuel tank as claimed in claim 1, characterized in that the wall of the tank consists of a multilayer extrudate with at least one barrier layer for hydrocarbons.

5. The fuel tank as claimed in claim 1, characterized in that the insert part is located between a flange-like margin provided by each of at least two shells.

6. The fuel tank as claimed in claim 1, characterized in that the insert part forms a plug connector.

7. The fuel tank as claimed in claim 1, characterized in that exactly three fluid lines are led into and/or out of the fuel tank.

8. The fuel tank as claimed in claim 7, characterized in that exactly one filler orifice, exactly one venting line and exactly one fuel extraction line are provided.

9. The fuel tank as claimed in claim 1, characterized in that the tank wall is provided by at least two shells which each provide a flange-like margin to form the seam.

10. The fuel tank as claimed in claim 9, characterized in that the first line which passes through the seam passes through the seam in a parting plane of the shells.

11. A fuel tank comprising:
a tank wall of thermoplastic;
at least one continuous seam which joins portions of the tank wall;
a filler orifice;

means which provide aeration and venting;

means which provide conveyance and extraction of fuel in a form of at least one fuel conveying unit arranged inside the fuel tank;

at least one line led into and/or out of the fuel tank, the at least one line led into and/or out of the fuel tank comprising at least one fluid line and/or at least one electrical line led into and/or out of the fuel tank;

wherein the at least one line led into and/or out of the fuel tank comprises a first line which passes through the seam of the fuel tank;

wherein the fuel tank does not include an inspection orifice, and the at least one fuel conveying unit provided in the fuel tank is designed for an entire service life of the fuel tank;

wherein the first line is connected to an insert part which passes through the seam of the fuel tank and which is at least partially of plastic and is welded to the tank at the seam;

wherein the insert part includes at least one of a plug contact and a leadthrough for the first line which is formed by a body of the insert part; and wherein the at least one plug contact and leadthrough is spaced from the seam by the body of the insert part and does not make contact with the seam.

12. The fuel tank as claimed in claim 11, characterized in that the first line which passes through the seam of the fuel tank further passes through the seam of the fuel tank so as to extend at an angle with respect to a profile of the seam.

13. The fuel tank as claimed in claim 11, characterized in that the at least one line led into and/or out of the fuel tank comprises a second line which is led at least partially through at least one of the filler orifice and a filler neck adjoining the filler orifice.

14. The fuel tank as claimed in claim 11, characterized in that the wall of the tank consists of a multilayer extrudate with at least one barrier layer for hydrocarbons.

15. The fuel tank as claimed in claim 11, characterized in that the insert part is located between a flange-like margin provided by each of at least two shells.

16. The fuel tank as claimed in claim 11, characterized in that the insert part forms a plug connector.

17. The fuel tank as claimed in claim 11, characterized in that exactly three fluid lines are led into and/or out of the fuel tank.

18. The fuel tank as claimed in claim 17, characterized in that exactly one filler orifice, exactly one venting line and exactly one fuel extraction line are provided.

19. The fuel tank as claimed in claim 11, characterized in that the tank wall is provided by at least two shells which each provide a flange-like margin to form the seam.

20. The fuel tank as claimed in claim 19, characterized in that the first line which passes through the seam passes through the seam in a parting plane of the shells.

21. A fuel tank comprising:
a tank wall of thermoplastic;
at least one continuous seam which joins portions of the tank wall;
a filler orifice;
means which provide aeration and venting;
means which provide conveyance and extraction of fuel in a form of at least one fuel conveying unit arranged inside the fuel tank;
a plurality of lines led into and/or out of the fuel tank, the plurality of lines led into and/or out of the fuel tank comprising at least one fluid line and/or at least one electrical line led into and/or out of the fuel tank;
wherein the plurality of lines led into and/or out of the fuel tank pass through the seam of the fuel tank;
wherein the plurality of lines are connected to an insert part which passes through the seam of the fuel tank and which is at least partially of plastic and is welded to the tank at the seam;
wherein the insert part includes at least one of a plug contact and a leadthrough for each line of the plurality of lines which is formed by a body of the insert part; and
wherein the at least one plug contact and leadthrough for each line is spaced from the seam by the body of the insert part and does not make contact with the seam.

22. The fuel tank as claimed in claim 21, characterized in that a first line which passes through the seam of the fuel tank further passes through the seam of the fuel tank so as to extend at an angle with respect to a profile of the seam.

23. The fuel tank as claimed in claim 21, characterized in that the plurality of lines led into and/or out of the fuel tank comprises a second line which is led at least partially through at least one of the filler orifice and a filler neck adjoining the filler orifice.

24. The fuel tank as claimed in claim 21, characterized in that the fuel tank does not include an inspection orifice, and the at least one fuel conveying unit provided in the fuel tank is designed for an entire service life of the fuel tank.

25. The fuel tank as claimed in claim 21, characterized in that exactly one filler orifice, exactly one venting line and exactly one fuel extraction line are provided.

26. The fuel tank as claimed in claim 21, characterized in that the wall of the tank consists of a multilayer extrudate with at least one barrier layer for hydrocarbons.

27. The fuel tank as claimed in claim 21, characterized in that the insert part is located between a flange-like margin provided by each of at least two shells.

28. The fuel tank as claimed in claim 21, characterized in that the insert part is designed as a plug connector.

29. The fuel tank as claimed in claim 21, characterized in that the tank wall is provided by at least two shells which each provide a flange-like margin to form the seam.

30. The fuel tank as claimed in claim 29, characterized in that a first line which passes through the seam passes through the seam in a parting plane of the shells.

31. A fuel tank comprising:
a tank wall of thermoplastic;
at least one continuous seam which joins portions of the tank wall;
a filler orifice;
means which provide aeration and venting;
means which provide conveyance and extraction of fuel in a form of at least one fuel conveying unit arranged inside the fuel tank;
at least one line led into and/or out of the fuel tank, the at least one line led into and/or out of the fuel tank comprising at least one fluid line and/or at least one electrical line led into and/or out of the fuel tank;
wherein the at least one line led into and/or out of the fuel tank comprises a first line which passes through the seam of the fuel tank;
wherein the wall of the tank consists of a multilayer extrudate with at least one barrier layer for hydrocarbons;
wherein the first line is connected to an insert part which passes through the seam of the fuel tank and which is at least partially of plastic and is welded to the tank at the seam;
wherein the insert part includes at least one of plug contact and a leadthrough for the first line which is formed by a body of the insert part; and wherein the at least one plug contact and leadthrough is spaced from the seam by the body of the insert part and does not make contact with the seam.

32. The fuel tank as claimed in claim 31, characterized in that the first line which passes through the seam of the fuel tank further passes through the seam of the fuel tank so as to extend at an angle with respect to a profile of the seam.

33. The fuel tank as claimed in claim 31, characterized in that the at least one line led into and/or out of the fuel tank comprises a second line which is led at least partially through at least one of the filler orifice and a filler neck adjoining the filler orifice.

34. The fuel tank as claimed in claim 31, characterized in that the fuel tank does not include an inspection orifice, and the at least one fuel conveying unit provided in the fuel tank is designed for an entire service life of the fuel tank.

35. The fuel tank as claimed in claim 31, characterized in that the insert part is located between a flange-like margin provided by each of at least two shells.

36. The fuel tank as claimed in claim 31, characterized in that the insert part is designed as a plug connector.

37. The fuel tank as claimed in claim 31, characterized in that exactly three fluid lines are led into and/or out of the fuel tank.

38. The fuel tank as claimed in claim 37, characterized in that exactly one filler orifice, exactly one venting line and exactly one fuel extraction line are provided.

39. The fuel tank as claimed in claim 31, characterized in that the tank wall is provided by at least two shells which each provide a flange-like margin to form the seam.

40. The fuel tank as claimed in claim 39, characterized in that the first line which passes through the seam passes through the seam in a parting plane of the shells.

* * * * *